A. M. OCOBOCK.
Improvement in Hubs for Vehicle-Wheels.
No. 132,596.                               Patented Oct. 29, 1872.
Fig. 1.
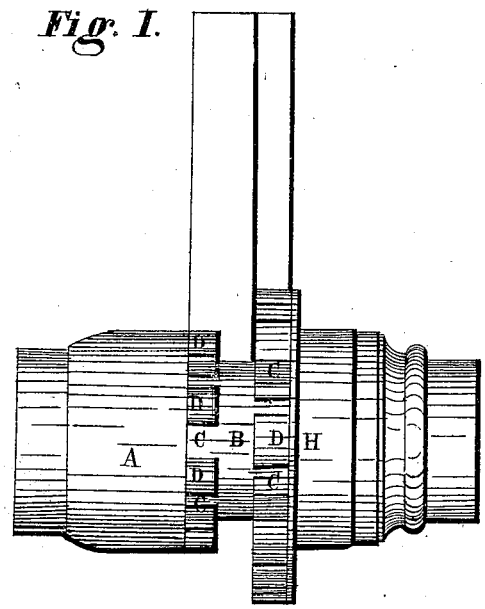
Fig. 2.
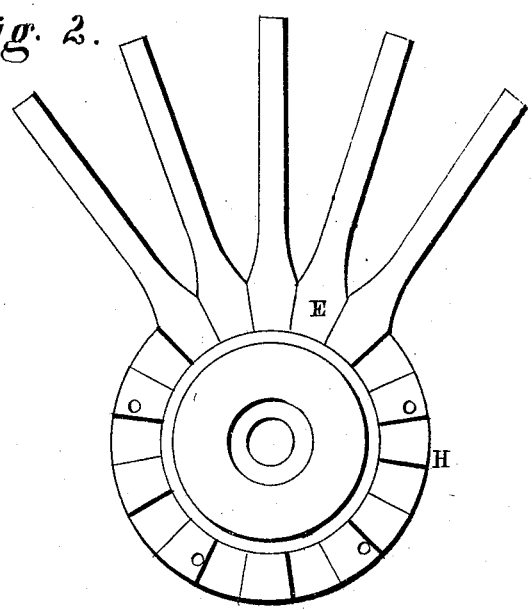
Fig. 4.
Fig. 3.
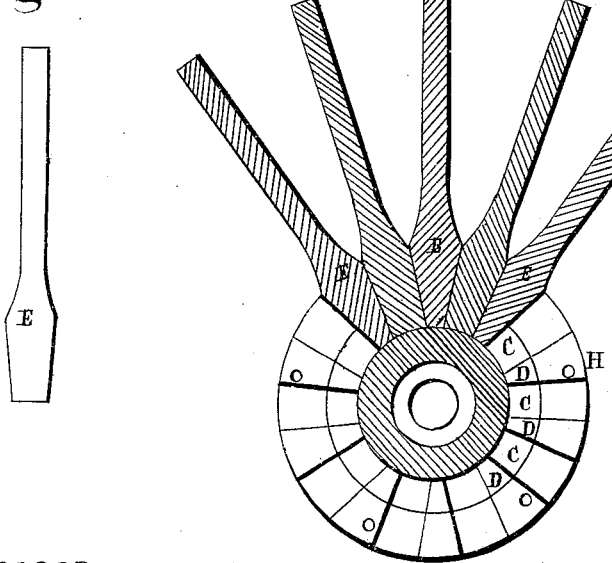
Fig. 5.
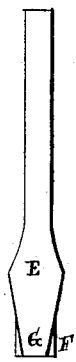
Witnesses.
Geo R Hay
A. F. Cornell
Inventor.
A. M. Ocobock.
Per Burridge & Co.
Attys.

UNITED STATES PATENT OFFICE.

ALEXANDER M. OCOBOCK, OF TOLEDO, OHIO.

IMPROVEMENT IN HUBS FOR VEHICLE-WHEELS.

Specification forming part of Letters Patent No. 132,596, dated October 29, 1872.

*To all whom it may concern:*

Be it known that I, ALEXANDER M. OCOBOCK, of Toledo, in the county of Lucas and State of Ohio, have invented a certain new and Improved Carriage-Wheel, of which the following is a description:

Figure 1 is a side view of a section of the wheel. Fig. 2 is an end view. Fig. 3 is a vertical section in direction of the line *x x*. Figs. 4 and 5 are detached sections.

Like letters of reference refer to like parts in the several views.

This invention has for its object the securing of spokes in the hub of a wheel by inserting the tenons thereof in mortises or gains cut in the sides of an annular groove surrounding the middle of the hub, and which spokes are further supported or braced by collars having a flange provided with a series of lugs or projections corresponding to the number of the gains or mortises, and of which it forms a part, and also an essential element of the wheel when made.

Of said wheel the following is a detailed description: The hub of the aforesaid wheel is made of wood, and is or may be of the ordinary shape, as shown at A, Fig. 1. Around the middle of the hub is formed a groove, B, in each side of which is cut a series of rectangular notches or gains, C, alternating with corresponding projections D. The relation that the gains and projections on one side of the groove hold to the gains and projections on the opposite side is such that the projections on one side are opposite the gains on the other, the purpose of which is to cause a staggering or an in-and-out relation of the spokes to each other, as shown in Fig. 1. The tenons of the spokes B' used in this wheel are not shouldered as the ordinary spoke, but are straight from the hip E, Fig. 2, down to the end; hence there are no shoulders to rest upon the surface of the hub or on the sides of the mortises. A view of a spoke is shown in Figs. 4 and 5, in which it will be seen that one half of the width of the tenon is thicker than the other, thus: The half F at the extreme end being thicker than the half G, it being nearly straight, whereas the part G tapers, as shown in Fig. 5. Each alternate spoke is thus made so that the part received in the gain C shall fit closely therein, whereas the part of the tenon exposed in the groove tapers so as to conform to the shape of the projection, the sides of which taper downwardly, whereas the sides of the gains do not. As the tenon of each alternate spoke is thus made, so, on the contrary, the tenon of each spoke alternating therewith is made straight, or of the shape of the thickest part of the tenon of the spokes above described, the purpose of which is to fill a rectangular space formed by the sides of the gains and the sides of the spokes on each side thereof, which, together, make a uniform rectangular space or mortise for the reception of each alternate spoke.

The several parts of the wheel are put together as follows: The hub having been prepared with the central groove B referred to, and the series of gains C alternating with the projections D, a spoke like to that shown in Fig. 5, is then driven into a gain, or so much of the tenon as will be embraced by the sides of the gain. The rest of the tenon will project beyond, into, and across the groove and abut against the side of the corresponding projection opposite the gain. The nearest side of the gain next in order, and so much of the side of the tenon as crosses the groove will form one side of a mortise, of which the end of the gain and the face of the projection will form the ends, respectively; whereas the opposite side of the gain forms a part of the other side of the mortise, leaving so much of that side of the mortise open as is the width of the groove, which, however, will be closed up by the tenon of a spoke when inserted in its order therein. One spoke having been driven in, the next one in order will be that having a straight tenon, or partially straight. This spoke, when driven in, hugs close to and in contact with the spoke already in, and which will also fill up the space caused by the groove, thereby completing one side of the third mortise for the third spoke, which spoke will be like that shown in Fig. 5, above described, and so on until all the spokes are driven in of both kinds, which, on being done, the collars H, Fig. 1, are then put on. One collar only is shown in the drawing. The other is not shown in order that the sides of the spokes and the gains and projections may be seen. Said collars are fitted closely on the hub and on each side of the spokes, against which they are tightly drawn by bolts or rivets inserted in the holes $a$. The collars are each formed with alternating gains and projections corresponding to those formed in the hub, and with which they are arranged in exact relation, as shown in the drawing, in which will be seen that they not only brace and support the spokes laterally, but that they also add to the depth of the mortises, practically forming a part thereof, of, reaching up so far as the hips of the spoke.

A wheel constructed as above described is light and neat in appearance. It is strong and durable, and not difficult and expensive to manufacture.

The spokes can be inserted in the hub by first driving in each alternate one, and then, with a chisel, cut away the side of the tenons to form a square mortise for the reception of the balance of the spokes, or such as shown in Fig. 4. Those first driven, when cut away after they are driven, will be like that shown in Fig. 5.

Claim.

What I claim as my invention, and desire to secure by Letters Patent, is—

The hub A, having cut around the middle thereof a groove, B, in the sides of which are made rectangular notches or gains C, and alternating therewith projections D, in combination with the collars H and spokes B', made as described, all constructed and arranged substantially in the manner as set forth, and for the purpose specified.

ALEXANDER M. OCOBOCK.

Witnesses:
J. H. BURRIDGE,
A. F. CORNELL.